United States Patent

Ijuin et al.

[11] Patent Number: 5,890,815
[45] Date of Patent: Apr. 6, 1999

[54] ROLLER BEARING

[75] Inventors: Seiji Ijuin; Yoshio Shoda; Tetsu Takehara; Katsuhiro Konno, all of Fujisawa, Japan

[73] Assignee: NSK Ltd., Tokyo, Japan

[21] Appl. No.: 967,817

[22] Filed: Nov. 12, 1997

[30] Foreign Application Priority Data

Nov. 13, 1996 [JP] Japan ................................ 8-301675
Oct. 31, 1997 [JP] Japan ................................ 9-299736

[51] Int. Cl.$^6$ ................................................ F16C 33/36
[52] U.S. Cl. ............................................................ 384/568
[58] Field of Search ................................... 384/568, 565

[56] References Cited

U.S. PATENT DOCUMENTS

| | | | |
|---|---|---|---|
| 4,027,930 | 6/1977 | Bodensieck | 384/568 X |
| 4,456,313 | 6/1984 | Hartnett et al. | 384/565 |
| 4,929,098 | 5/1990 | Takata et al. | 384/568 |
| 5,752,775 | 5/1998 | Tsutsui et al. | 384/568 |

*Primary Examiner*—Thomas R. Hannon
*Attorney, Agent, or Firm*—Evenson, McKeown, Edwards & Lenahan, P.L.L.C.

[57] ABSTRACT

A roller bearing comprising an outer ring having an outer ring raceway, an inner ring having an inner ring raceway, the inner peripheral surface at the end portion of the outer ring and/or the outer peripheral surface at the end portion of the inner ring formed with a flange portion, and a plurality of rollers having a rolling surface in contact with the outer and inner ring raceways, a sliding contact face in sliding contact with the inner face of the flange portion, and a chamfered portion provided between the sliding contact face and the rolling face, the sliding contact face smoothly connected to the chamfered portion in a curved surface the radius of curvature of which is at least 0.08 mm, and provided that the center line average height roughness of the sliding contact surface is $\delta_1$ while the center line average height roughness of the inner face in contact with the sliding surface is $\delta_2$, the composite roughness represented by the formula $(\delta_1^2+\delta_2^2)^{1/2}$ is up to 0.09 $\mu$mRa.

1 Claim, 6 Drawing Sheets

ROLLER BEARING

FIELD OF THE INVENTION

The present invention is related to a roller bearing which is installed in various kinds of machines and apparatus to form a rotating support portion, particularly to a roller bearing in which seizure and scuffing are prevented from occurring in the roller bearing even when the amount of lubricant is short in the rotating support portion in which the roller bearing is installed, or which hardly experiences seizure even when any breakdown is caused in a lubrication system.

DESCRIPTION OF THE PRIOR ART

The rotating support portion in various machines and apparatus has a rolling bearing installed therein. The roller bearing having cylindrical, spherical or tapered rollers for rolling members is used for the rolling bearing to compose a rotating support portion which receives a large load.

FIG. 6 shows an example of such roller bearing, which is a cylindrical roller bearing 1 to be Installed in the rotating support portion to which a large radial load is applied. The cylindrical roller bearing 1 comprises an outer ring 3 having an inner peripheral surface which is formed with an outer ring raceway 2 with a cylindrical surface, an inner ring 5 having an outer peripheral surface which is formed with an inner ring raceway 4 with a cylindrical surface, and a plurality of cylindrical rollers 6 rotatably provided between the outer ring raceway 2 and the inner ring raceway 4. These cylindrical rollers 6 have an outer peripheral surface forming a rolling surface 7 in contact with the outer ring raceway 2 and the inner ring raceway 4. The outer ring 3 has an inner peripheral surface while the inner ring 5 has an outer peripheral surface. Each of the inner and outer peripheral surfaces is formed with a flange portion 8 at either and.

FIG. 7 shows a cylindrical roller for such cylindrical roller bearing 1, in which a chamfered portion 10 is formed between the rolling surface 7 of the outer peripheral surface and each of the axial end faces 9.

In the case of the cylindrical rollers 6 installed in the conventional cylindrical roller bearing 1, the transition portion between the chamfered portion 10 and the axial end face 9 has a very small radius of curvature.

Specifically, as in FIG. 7, the chamfered portion 10 is provided between the axial end edge of the rolling surface 7 and the axial end face 9 on the either side. The inner peripheral edge of the chamfered portion 10 is continued to the outer peripheral edge of the axial end face 9 with a corner portion 11 between them as detailed in FIG. 8. The radius of curvature is very small in this corner portion 11, the reasons of which are explained later.

FIG. 9 shows a tapered roller bearing 12 which is used in the rotating support portion which bears not only a large radial load but also a large thrust load. The rolling members of this tapered roller bearing 12 are not cylindrical rollers 6 (FIG. 6) but tapered rollers 13. The inner peripheral surface of the outer ring 3a is formed with outer ring raceway 2a of a tapered concave shape, and the outer peripheral surface of the inner ring 5a is formed with a inner ring raceway 4a of a tapered convex shape.

The outer peripheral surface of the inner ring 5a is formed with a flange portion 8a at a larger diameter end thereof and a flange portion 8b at a smaller diameter end thereof. The flange portion 8a has an inner face 14 which is faced to the end face 15 on its larger diameter side of the tapered rollers 13. When using the tapered roller bearing 12, the end face 15 on its larger diameter side functions as a sliding surface in contact with the inner face 14 while bearing the thrust load. The tapered rollers 13 are provided with the chamfered portion 10 at its either axial end edge, which is similar to the cylindrical rollers 6 as mentioned above.

In order to compose a rotating support portion with the cylindrical roller bearing 1 or the tapered roller bearing 12, for example, the outer ring 3 or 3a is securely fitted into the housing (not shown) and the inner ring 5 or 5a is fitted onto the rotating shaft (not shown). In the state where the cylindrical roller bearing 1 or the tapered roller bearing 12 is installed in such a way in the rotating support portion, a radial load is applied to the cylindrical roller bearing 1, and radial and thrust loads are applied to the tapered roller bearing 12. The thrust load is applied, as shown by arrows x in FIG. 9, in a direction where the tapered rollers are held between the outer ring raceway 2a and the inner ring raceway 4a.

Consequently, the end face 15 on the larger diameter side of the tapered rollers 13 is pushed onto the inner face 14 of the flange portion 8a on the outer peripheral surface of the end portion on the larger diameter side of the inner ring 5a. The end face 15 on the larger diameter side comes into contact with the inner face 14 at the elliptic contact portion 16 as shown by cross hatching in FIG. 10. This contact portion 16 moves in a circumferential direction as the tapered rollers 13 roll while the outer ring 3a and inner ring 5a rotate relatively.

Specifically, as the outer ring 3a and inner ring 5a rotate relatively, the end face 15 on the larger diameter side and the inner face 14 rub each other, and the end face 15 on at the larger diameter side becomes a sliding surface with respect to the inner face 14 while bearing the thrust load.

Conventionally, when producing the cylindrical rollers 6 for the cylindrical roller bearing 1 or the tapered rollers 13 for the tapered roller bearing 12, the rolling surface 7 of the cylindrical roller 6 (rolling surface 7a of the tapered roller 13), the axial end faces 9 (larger diameter side end face 15) and the chamfered portions 10 are all processed in cold working, cutting, or grinding before grinding the axial end faces 9, (larger diameter side end face 15) and the rolling face 7(7a).

Accordingly, the corner portion 11 to continuously connect the chamfered portion 10 with the axial end face 9 (larger diameter side end face 15) is formed in a curved surface with a extremely small radius of curvature, in other words, in a tip end edge shape.

The spherical rollers for the self aligning roller bearing has also a tip end edge portion as mentioned above, although omitted from the drawings, where even when the rotatable shaft onto which the inner ring is fixed is not aligned in axis with the bearing housing into which the outer ring is securely fitted, the relative displacement between the axis of the inner ring and the axis of the outer ring compensates that misalignment.

It is difficult to secure the enough endurance and reliability in the conventional cylindrical roller bearing 1, tapered roller bearing 12 or self-aligning roller bearing in a poor lubrication condition due to the shape of the corner portion 11 to connect the chamfered portion 10 on the cylindrical roller 6 or tapered roller 13 to the axial end face 9 (end face 15 on the larger diameter side), and due to the nature of the end face 15 on the larger diameter side and the inner face 14 which are rubbing with each other (or due to the nature of the axial end face 9 of the cylindrical portion 6 and the inner face 14 of the flange portion 8).

The reasons of this case are explained using the tapered roller bearing 12 as an example in FIG. 9 to FIG. 12.

As a thrust load is applied to the tapered roller bearing 12 during use, the end face 15 on the larger diameter side of the tapered roller 13 is forced onto the inner face 14 of the flange portion 8a, so that a contact area is formed between the end face 15 and the inner face 14 is formed depending on the size and shape of the end face 15 and the inner face 14, which is illustrated by cross-hatching in FIG. 10. Part of the thrust load is supported by the contact area 16 illustrated by the cross-hatching.

If the amount of the lubricant is insufficient in the contact area 16 in the state where the end face 15 on the larger diameter side of each of the tapered rollers 13 comes into contact the inner face 14 of the flange portion 8a at the contact area 16 in a rubbing relationship, it is difficult for the lubricant film to be formed between the end face 15 of the tapered roller 13 and the inner face 14 of the flange portion 8a at the contact area 16. Consequently, friction at the contact area 16 is increased, the tapered roller 13 is relatively largely inclined in the rolling direction as shown in FIG. 11. This is referred to as "skew". Because of the skew occurring, the contact portion 16, as shown in FIG. 12, is displaced from the normal position shown by chain lines in FIG. 12 to a portion closer to the outer periphery of the tapered roller 13 as shown by cross hatching in FIG. 12. As this displacement is enlarged, the contact portion 16 reaches the chamfered portion 10 formed on the outer peripheral edge portion of the tapered roller 13. Once the contact portion 16 reaches the chamfered portion 10, flaws such as scuffing, seizure etc. are inclined to be produced in the contact portion 16 as follows;

Specifically, (1) The area of the contact portion 16 is decreased, and the contact pressure in the whole contact portion 16 is increased, so that the thickness of the oil film between the end face 15 on the larger diameter side and the inner face 14 is decreased.

(2) The end edge of the contact portion 16 exists at the corner portion 11 with a small radius of curvature which is placed at a boundary portion between the chamfered portion 10 and the end face 15 on the larger diameter side. A large edge stress is caused around the end edge, so that the lubricant oil film is easily broken. Consequently, metal-to-metal contact is inclined to occur in this area, leading to flaws such as scuffing, seizure etc. in the contact portion 16.

The flaws due to such reasons particularly outstandingly occur in the case of the tapered roller bearing 12 receiving particularly large thrust loads, and may occur in the cylindrical roller bearing 1 and in the self-aligning roller bearing if any raceway ring is formed with a flange portion.

For example, in Japanese Patent First Publication H7-12133, taking into consideration such situation, an invention to prevent the flaws as mentioned above by increasing the radius of curvature of the corner portion 11. However, in this invention, the flaws are not necessary sufficiently prevented in a severe condition for example in the case where the amount of lubricant oil is extremely little, because the nature of the two faces (axial end face 9 or end face 15 the larger diameter side and inner face 14) of the contact portion 16 is not taken into consideration,

SUMMARY OF THE INVENTION

An object of the present invention is to provide a roller bearing in which flaws such as scuffing, seizure are prevented from occurring in the contact portion between the axial end face on the larger diameter side of the tapered roller and the inner face.

BRIEF DESCRIPTION OF THE INVENTION

DETAILED DESCRIPTION OF THE PREFERRED EMBODIMENTS

The following is an explanation on the experiments conducted by the inventors to confirm the results of the present invention.

Figure 9:
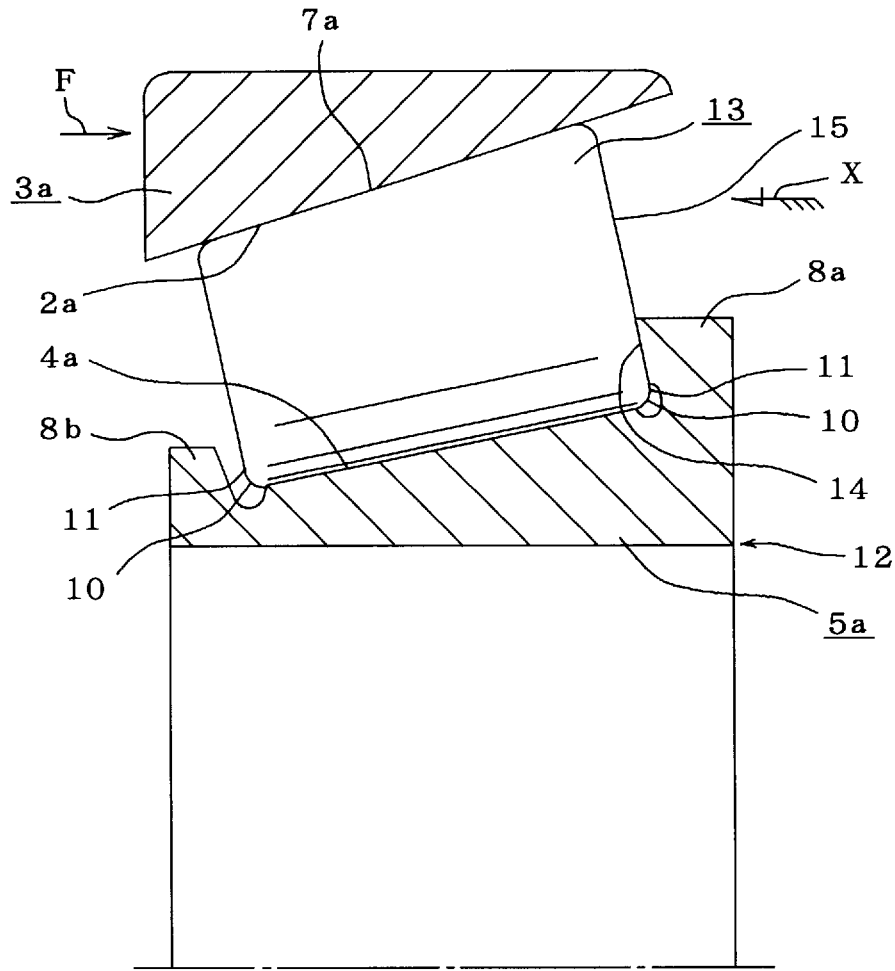
FIG. 9 is a partial cross sectional view showing a second example of the roller bearing to which the present invention is applied.
Figure 10:
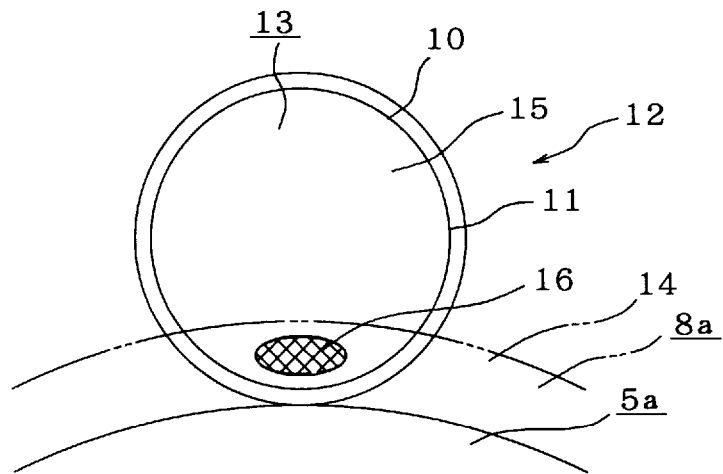
FIG. 10 is a view in the direction of Arrow X in FIG. 9 showing a normal contact condition between the and face of the roller and the inner face of the flange portion.
Figure 11:
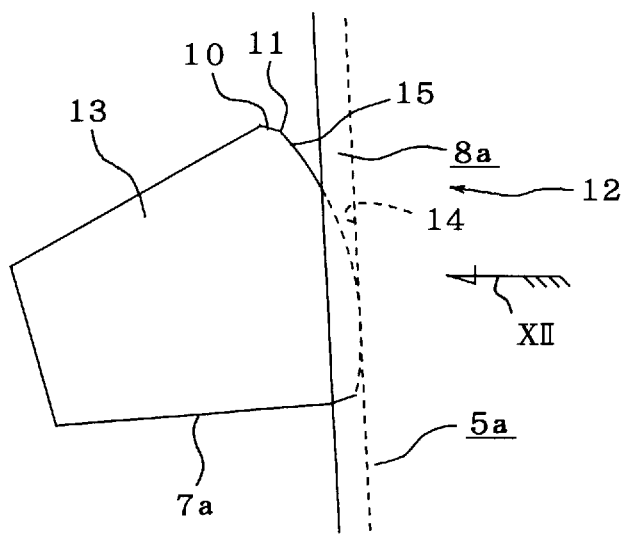
FIG. 11 is a plan view showing the roller in the skewed condition with the outer ring omitted.
Figure 12:
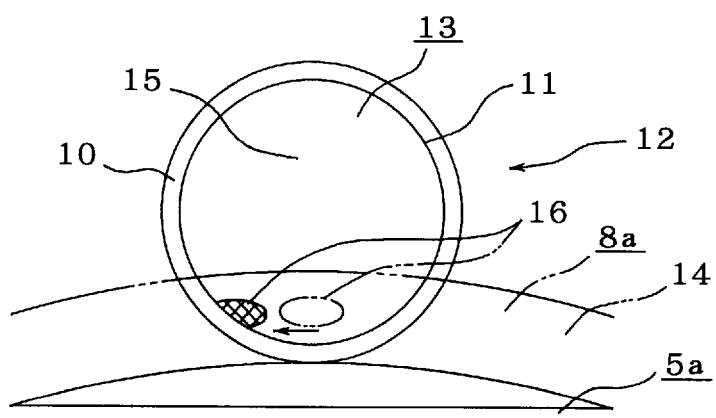
FIG. 12 is a view in the direction of Arrow XII in FIG. 11 showing a contact condition between the end face of the roller and the inner face of the flange portion.

In the experiments, tapered roller bearings 12 having an inner diameter of 30 mm as shown in FIG. 9 were used, and experiments for evaluation on the resistance to seizure for the tapered roller bearings 12 were conducted, changing the radius of curvature of the transition portion (curve 17) to continuously connect the chamfered portion 10 to the end face 15 on the larger diameter side of the tapered rollers 13 installed in the tapered roller bearings 12 and the center line average height roughness of the end face 15 on the larger diameter side and the inner face 14 of the flange portion 8a opposed to the end face 15 on the larger-diameter side. All the tapered rollers 13 to be installed in a single tapered roller bearing 12 have the same radius of curvature at the transition portion and the same center line average height roughness of the end face 15 on the larger diameter side.

The following are experiment parameters.

Rotating speed 6,000 rpm

Thrust Load: 4,000 N

Oil Supply Rate At Supply, Stoppage: 480 cc/min

Lubricant Oil: Gear Oil (180 cSt/40° C.)

The results of experiments under this condition is shown in Table 1.

TABLE 1

| Specimen No. | radius of Curvature at transition portion (mm) | Center Line average height roughness ($\mu$ mRa) | | | hardness (HRc) | | time to sizeure (sec) |
|---|---|---|---|---|---|---|---|
| | | Roller end face $\sigma 1$ | inner face of flange $\sigma 1$ | composite roughness ($\sigma 1^2 \frac{1}{2} + \sigma 1^2$) | tapered roller | flange portion | |
| 1 | 0.09~0.13 | 0.06 | 0.07 | 0.09 | 65 | 64 | 1,000 or more |
| 2 | 0.09~0.13 | 0.05 | 0.07 | 0.09 | 65 | 64 | 1,000 or more |
| 3 | 0.02~0.04 | 0.05 | 0.07 | 0.09 | 65 | 64 | 175 |
| 4 | 0.02~0.04 | 0.06 | 0.07 | 0.09 | 65 | 64 | 125 |
| 5 | 0.08~0.09 | 0.09 | 0.06 | 0.11 | 63 | 64 | 415 |
| 6 | 0.08~0.09 | 0.05 | 0.08 | 0.09 | 65 | 64 | 1,000 or more |
| 7 | 0.01~0.03 | 0.06 | 0.07 | 0.09 | 65 | 64 | 105 |
| 8 | 0.01~0.03 | 0.04 | 0.07 | 0.08 | 63 | 64 | 40 |
| 9 | 0.01~0.03 | 0.12 | 0.07 | 0.14 | 65 | 65 | 20 |
| 10 | 0.01~0.06 | 0.06 | 0.08 | 0.10 | 65 | 65 | 60 |

The value of radius of Curvature at the transition portion shown in Table 1 is measured using a form and surface texture instrument of Form Talysurf made by Taylor-Hobson. The radius of curvature can, however, be determined briefly with a shape measurement device of general contact probe type such that the surface shape of the tapered roller 13 is measured in a hyposetic surface extending through the axis of the roller from the end face 15 to the chamfered portion 10, and for example on the basis of the measurement record enlarged by a degree of magnification: longitudinal 200 times × lateral 200 times, the surface shape is read out with a circular rule.

The canter line average height roughness of each surface is obtained with the roughness-shape measurement device of Taylor-Hobson.

The time to reach seizure which indicates the resistance to seizure is measured, in the state where the inner ring 5a of the tapered roller bearing 12 is driven with lubricant oil supplied in the operating condition as mentioned above, from the point when the lubricant oil supplied to the tapered roller bearing 12 is stopped to the point when the seizure occurs. The occurrence of seizure is determined by the fact that the torque required to rotate the inner ring 5a is suddenly increased.

The Rockwell hardness $HR_C$ in Table 2 indicates the surface hardness of the tapered roller 13 and the inner face 14 of the flange portion 8a.

From Table 1, the time to seizure is substantially longer in the Specimen Nos. 1, 2, 5 and 6, which are tapered roller bearings having tapered rollers with 0.08 mm or more of radius of curvature at the transition portion than in the tapered roller bearings having tapered rollers with 0.08 mm or less of radius of curvature at the transition portion.

The present inventors conducted an analysis according to the three dimensional boundary element method on the edge stress (surface pressure) produced in a portion, corresponding to the transition portion, in the end edge portion of the contact portion 16 between the end face 15 on the larger diameter side and the inner face 14 of the flange portion 8a of the tapered roller bearing 13 when the tapered rollers 13 have skewed. This result is shown in FIG. 2, where the radius of curvature of the transition portion is changed with reference to the contact portion 16 between the inner face 14 (FIG. 9) of the flange portion 8a of the inner ring 5a and the tapered roller 13 with the 175 mm of radius of curvature in the end face 15 on the larger diameter side, the average diameter of 2.4 mm, and the chamfered size of 2.4 mm.

Figure 1:
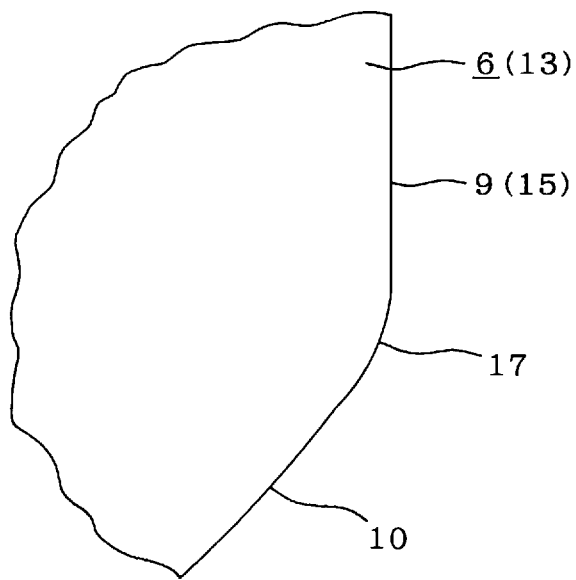
FIG. 1 is an enlarged view of one end portion of the roller installed in the roller bearing in one embodiment according to the present invention.
Figure 2:
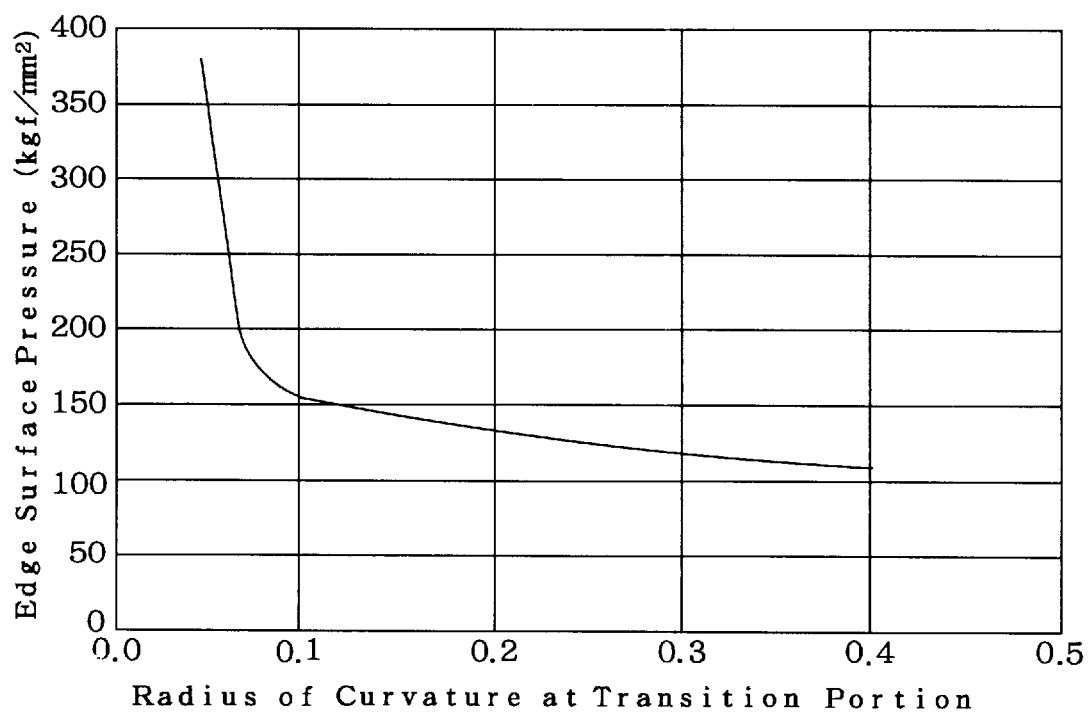
FIG. 2 is a diagram showing the relation between the edge face pressure and the radius of curvature at a transition portion between the chamfered portion of the roller and the axial end face.

As clear in FIG. 2 which shows the results of analysis the edge stress (pressure) is rapidly increased when the radius of curvature of the transition portion is decreased to 0.08 mm or less. Accordingly, it will be noticed that the radius of curvature of the transition portion must be 0.08 or more in order to secure the resistance to seizure of the tapered roller bearing 12 in the state where the lubricant oil supply is insufficient.

With reference to the composite roughness of the center line average height roughness of the end face 15 on the larger diameter side of the tapered roller 13 and the center line average height roughness of the inner face 14 of the flange portion 8a, from the comparison between Specimen No. 7 with smaller composite roughness and Specimen No. 9 with larger composite roughness, the time to seizure is longer in Specimen No. 7 than in Specimen No. 9. Particularly, the time to seizure is substantially long in Specimens Nos. 1, 2 and 6, where the radius, of curvature of the transition portion is 0.08 mm or more and the composite roughness $(\delta_1^2 + \delta_2^2)^{\frac{1}{2}}$ is 0.09 $\mu$mRa or less.

With reference to the hardness of the surface portion of the tapered roller 13 and the hardness of the surface portion of the flange portion 8a, from the comparison between Specimen No. 7 having a higher hardness in the surface portion of the tapered roller 13 than in the surface portion of the flange portion 8a and Specimen No. 8 having a higher hardness in the surface portion of the flange portion 8a then in the surface portion of the tapered roller 13, it will be noted that the time to seizure is longer in Specimen No. 7 than in Specimen No. 8.

In Specimen No. 5, the hardness of the surface portion of the tapered roller 13 is lower than the hardness of the surface portion of the flange portion 8a, and the composite roughness is larger than Specimen No. 6.

The time to seizure is substantially longer in Specimen No. 5 than in the tapered roller: 13 e.g. of Specimen No. 4 having a smaller radius of curvature of the transition portion.

However, the time to seizure of Specimen No. 5 is shorter than that of Specimen No. 6, specifically half or less of that of Specimen No. 6.

Therefore, it will be understood that in addition that the radius of curvature of the transition portion is 0.08 mm or more, it is desirable in order to improve the resistance to seizure that the composite roughness of the end face 15 on the larger diameter side of the tapered roller 13 and the inner face 14 of the flange portion 8a is small while the surface hardness of the tapered roller 13 is higher than the surface hardness of the inner face 14 of the flange portion 8a.

Figure 4:
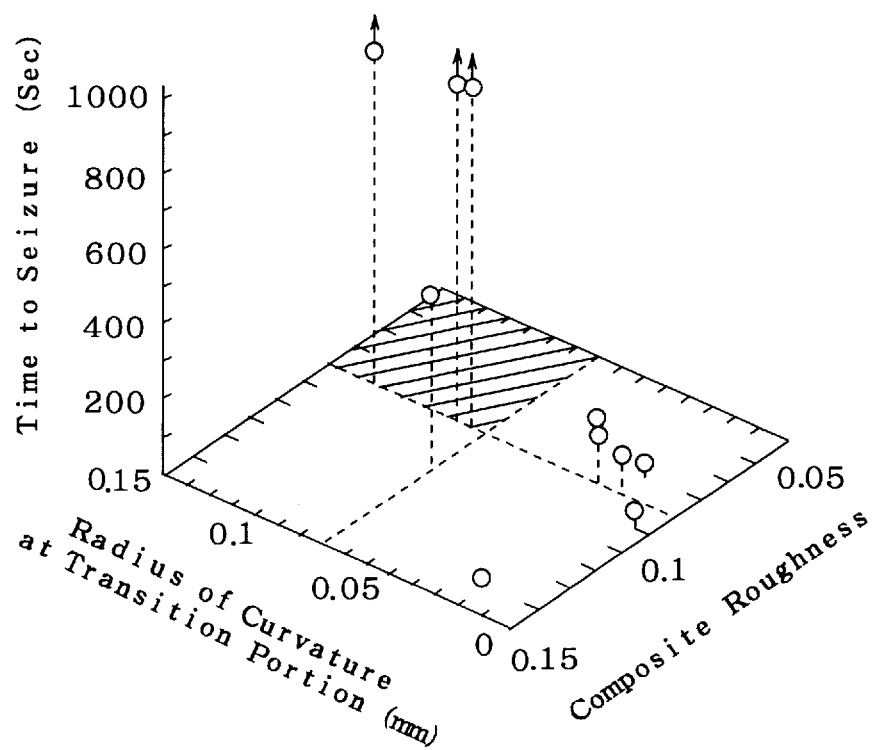
FIG. 4 is three-dimensional coordinates to show the results of experiments conducted to confirm the results of the present invention.

FIG. 4 is three dimensional coordinates showing a relation among the time to seizure, the radius of curvature of the transition portion to make the sliding contact surface continued to the chamfered portion, and the composite of the center line average height roughness of the sliding contact surface and the center line average height roughness of the inner face of the flange portion. The hatched area in the graph represents the present invention. From FIG. 4, the time to seizure is sufficiently long in the present invention.

It should be noted that with respect to the center line average height roughness of the end face 15 on the larger diameter side of the tapered roller 13 and of the inner face 14 of the flange portion 8a, the direction of the center line average height roughness better be orthogonal to the direction of relative movement of the end face 15 on the larger diameter side of the tapered roller 13 with the inner face 14 of the flange portion 18 to advantageously form the oil film. This Is disclosed for example in a paper of N. Ptir and H. S. Chang "Effect of surface roughness orientation on the central film thickness in E.H.D. contacts" (Proceedings of the 5th Leeds-Lyon Symposium on Tribology— ELASTOHYDORODYNAMICS AND RELATED TOPICS, 1979).

In order to enlarge the radius of curvature of the transition portion between the chamfered portion 10 of the tapered roller 13 and the end face 15 on the larger diameter side, any conventional process methods can be utilized. For example, when the end face of the tapered roller 13 is subjected to a grinding process, the grinding stone is formed in a special shape to control the radius of curvature of the transition portion to a required value.

In another way, the tapered roller 13 is subjected, after to a normal grinding process, to a barrel process to control the radius of curvature of the transition portion to a required value.

Figure 3:
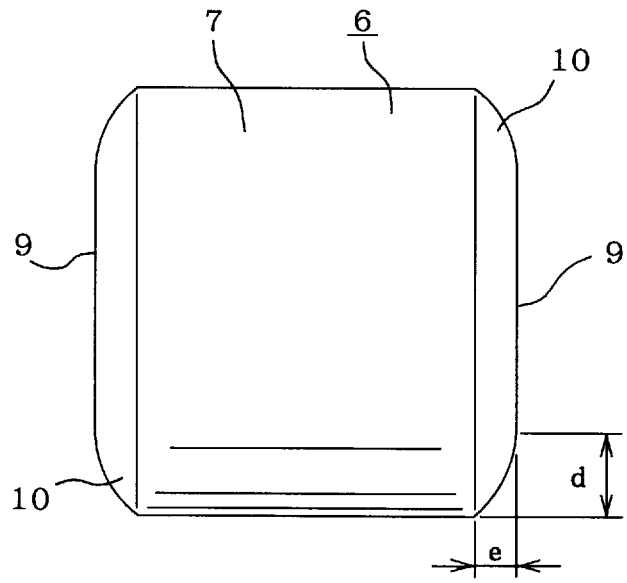
FIG. 3 is a side elevational view to explain the size of the chamfered portion formed in the end edge portion of the roller.

In order to more properly conduct the barrel process to control the radius of curvature of the transition portion to a required value, as shown in FIG. 3, the chamfered portion 10 is desirably formed such that the ratio (d/e) of the size (e) in the axial direction of the roller to the size (d) in the radial direction of the roller is 1.2 or more (d/e≧1.2).

Figures 5, 6:
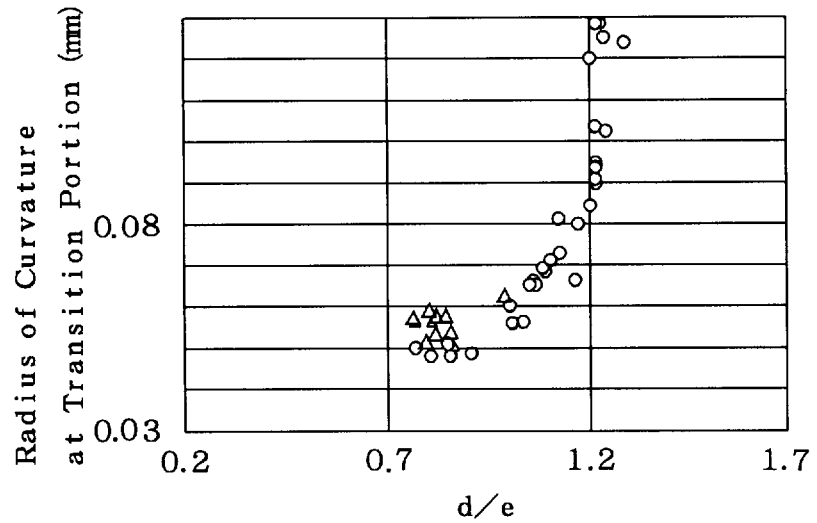
FIG. 5 is a graph to show a relation between the radius of curvature of a curved surface formed at the transition portion by barrel processing, and the axial and radial sizes of the roller at the chamfered portion.
FIG. 6 is a partially cross-sectional, perspective view showing an example of the roller bearing to which the present invention is applied.
Figure 7:
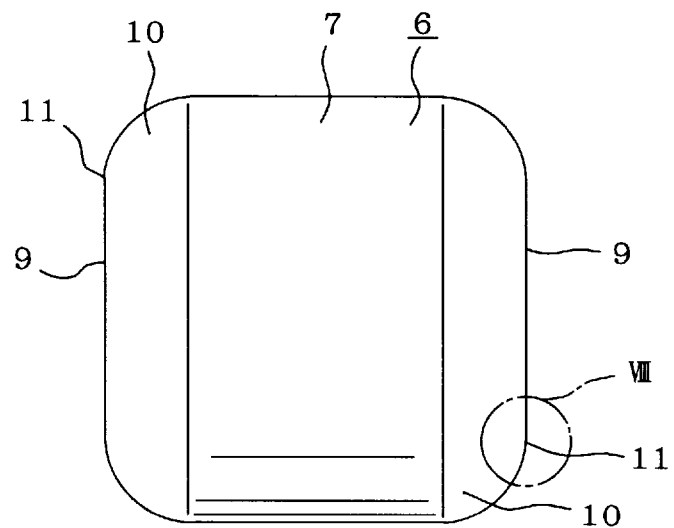
FIG. 7 is a side elevational view showing an example of the roller installed in the conventional roller bearing.
Figure 8:
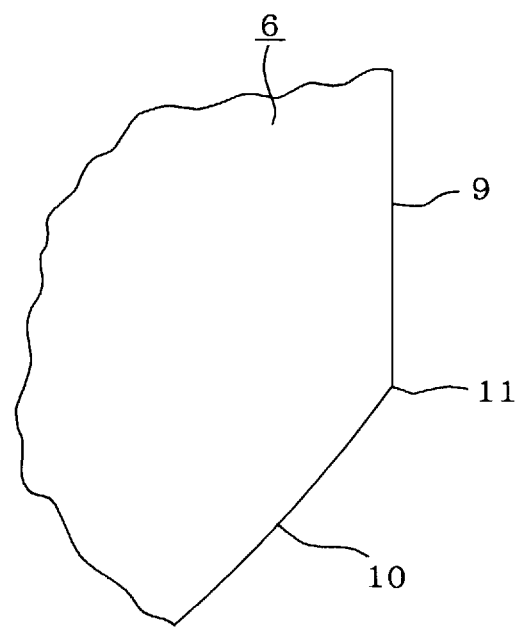
FIG. 8 is an enlarged view of the portion VIII in FIG. 7.

The following is the reason of this. As shown in FIG. 5 with the ratio of d/e which is larger in this case than in the case of normal chamfering size ratio (d/e=1), the barrel process can be conducted to make the radius of curvature of the transition portion 0.08 mm or higher in a short process time, without making worse the finished condition (roughness, waviness) of the end face and raceway of the roller.

Specifically, because of the larger ratio of d/e and larger angle of the transition portion, the ratio of curvature can be made large with a short time of barrel process, without making worse the finished condition of the raceway and end face.

In FIG. 5, the abscissa represents the ratio of d/e while the ordinate represents the radius of curvature, and the symbol ○ indicates the case of one hour barrel process and the symbol Δ indicates the case of two hour barrel process.

Although the embodiments above are related to the tapered roller bearing. The present invention can be applied to the cylindrical roller bearings and self-aligned roller bearings where the thrust load is applied to between the axial end face and the inner face of the flange portion on the peripheral surface of the raceway ring in the roller.

The present invention is also effective in the rollers in contact with the floating ring of self-aligning with the flange portion being not fixed to the raceway ring.

The roller bearing according to the present invention, constructed and operated as mentioned above, endures long before the flaws such as scuffing or seizure occur in the poor lubricating condition, and therefore the reliability and endurance of the rotating support portions with the roller bearing installed therein can be improved.

What is Claimed is:

1. A roller bearing comprising an outer ring having an inner peripheral surface formed with an end portion and an outer ring raceway, an inner ring having an outer peripheral surface formed with an end portion and an inner ring raceway, at least one of the inner peripheral surface at the end portion of the outer ring and the outer peripheral surface at the end portion of the inner ring formed with a flange portion having an inner face, and a plurality of rollers having an outer peripheral surface which is a rolling surface in contact with the outer and inner ring raceways, an axial end face which forms a sliding contact face in sliding contact with the inner face of the flange portion, and a chamfered portion provided between the sliding contact face and the rolling face, the sliding contact face smoothly connected to the chamfered portion in a curved surface the radius of curvature of which is at least 0.08 mm, and provided that the center line average height roughness of the sliding contact surface is $\delta_1$ while the center line average height roughness of the inner face in contact with the sliding surface is $\delta_2$, the composite roughness represented by the formula $(\delta_1^2+\delta_2^2)^{1/2}$ is up to 0.09 μmRa.

* * * * *